(12) United States Patent
Park et al.

(10) Patent No.: US 8,451,324 B2
(45) Date of Patent: May 28, 2013

(54) APPARATUS AND METHOD FOR DISPLAYING THREE DIMENSIONAL IMAGE

(75) Inventors: Ju Yong Park, Seoul (KR); Gee Young Sung, Daegu-si (KR); Du-Sik Park, Suwon-si (KR); Dong Kyung Nam, Yongin-si (KR); Yun-Tae Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1017 days.

(21) Appl. No.: 12/382,123

(22) Filed: Mar. 9, 2009

(65) Prior Publication Data

US 2010/0073465 A1 Mar. 25, 2010

(30) Foreign Application Priority Data

Sep. 22, 2008 (KR) .................. 10-2008-0092649

(51) Int. Cl.
*H04N 13/04* (2006.01)

(52) U.S. Cl.
USPC ............... 348/51; 348/42; 348/43; 348/44; 348/45; 348/46; 348/47; 348/48; 348/49; 348/50

(58) Field of Classification Search
USPC .................................................. 348/42–60
See application file for complete search history.

(56) References Cited

U.S. PATENT DOCUMENTS

| 6,094,216 A | * | 7/2000 | Taniguchi et al. | 348/51 |
|---|---|---|---|---|
| 2003/0025995 A1 | * | 2/2003 | Redert et al. | 359/464 |
| 2006/0082574 A1 | * | 4/2006 | Tsubaki | 345/419 |
| 2007/0058258 A1 | * | 3/2007 | Mather et al. | 359/619 |
| 2010/0207961 A1 | * | 8/2010 | Zomet | 345/630 |

FOREIGN PATENT DOCUMENTS

| JP | 08-327948 | 12/1996 |
|---|---|---|
| JP | 09-197343 | 7/1997 |
| JP | 10-161061 | 6/1998 |
| JP | 11-285029 | 10/1999 |
| JP | 2006-259191 | 9/2006 |
| KR | 10-0274625 | 9/2000 |
| KR | 10-2003-0021293 | 3/2003 |
| KR | 10-2006-0060102 | 6/2006 |
| KR | 10-2006-0096844 | 9/2006 |
| KR | 10-2007-0016651 | 2/2007 |
| KR | 10-2008-0022968 | 3/2008 |

\* cited by examiner

*Primary Examiner* — Liangche A Wang
*Assistant Examiner* — Cheikh Ndiaye
(74) *Attorney, Agent, or Firm* — Staas & Halsey LLP

(57) ABSTRACT

Disclosed are a 3D image display apparatus and method. The 3D image display apparatus may adjust a number of viewpoints of a 3D image, distance between viewpoints, and other parameters through varying a display pattern of a viewing zone generating unit and a distance between an image display unit and the viewing zone generating unit. Accordingly, the 3D image display apparatus may effectively express the 3D image suitable for various viewing circumstances.

20 Claims, 11 Drawing Sheets

APPARATUS AND METHOD FOR DISPLAYING THREE DIMENSIONAL IMAGE

CROSS-REFERENCE TO RELATED APPLICATIONS

This application claims the benefit of Korean Patent Application No. 10-2008-0092649, filed on Sep. 22, 2008, in the Korean Intellectual Property Office, the disclosure of which is incorporated herein by reference.

BACKGROUND

1. Field

Example embodiments relate to an apparatus and method for displaying a 3-dimensional (3D) image, and particularly, to a 3D display apparatus which may adjust a number of viewpoints of the 3D image and viewing angle.

2. Description of the Related Art

As demand for a 3D stereoscopic image increases in fields such as games, movies, etc., techniques related to a 3D image display that displays a 3D stereoscopic image are being developed.

In general, a 3D image display apparatus displays 2-dimensional (2D) images to two eyes of a human respectively to display the 3D image. That is, the human may see a pair of the 2D images through the two eyes, and then, a human brain fuses the two 2D images, thereby experiencing stereoscopy.

As an apparatus for displaying 3D image, there is a 3D display apparatus using a linearly polarized light method that separates a left-eye view and right-eye view using stereoscopic glasses, however, inconvenience occurs since a user must wear the glasses. Therefore, various methods of producing a stereoscopic effect without wearing glasses are suggested.

The methods usually include constructing a stereoscopic system through combining a flat panel display device, such as a Liquid Crystal Display (LCD) or a Plasma Display Panel (PDP), with a device for separating an image for each direction. Depending on the device for separating the image for each direction, the system may be classified into a lenticular method using a lenticular lens sheet, a parallax method using a slit array sheet, a backlight distribution method, an integral photography method using a microlens array sheet, a holography method using an interference, etc.

SUMMARY

Example embodiments may provide an apparatus for displaying a 3-dimensional (3D) image, the apparatus including an image display unit to display a multiview image, a viewing zone generating unit having a display pattern to generate a plurality of viewing zones corresponding to the multiview image according to the display pattern, and a controller to vary a distance between the image display unit and the viewing zone generating unit, and the display pattern.

In an aspect of example embodiments, an apparatus for displaying a 3D image may further include a parameter obtaining unit to obtain an image display parameter including at least one piece of information from among: a number of viewpoints of a 3D image, a distance between viewpoints, and a distance from the 3D image display apparatus to a viewpoint, and a controller may operate based on the image display parameter.

Example embodiments may also provide a method of displaying a 3D image including obtaining a multiview image, displaying the multiview image on the image display unit after rendering the multiview image, varying a display pattern of the pattern display unit to generate a plurality of viewing zone corresponding to the rendered multiview image, and varying a distance between the image display unit and the pattern display unit.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
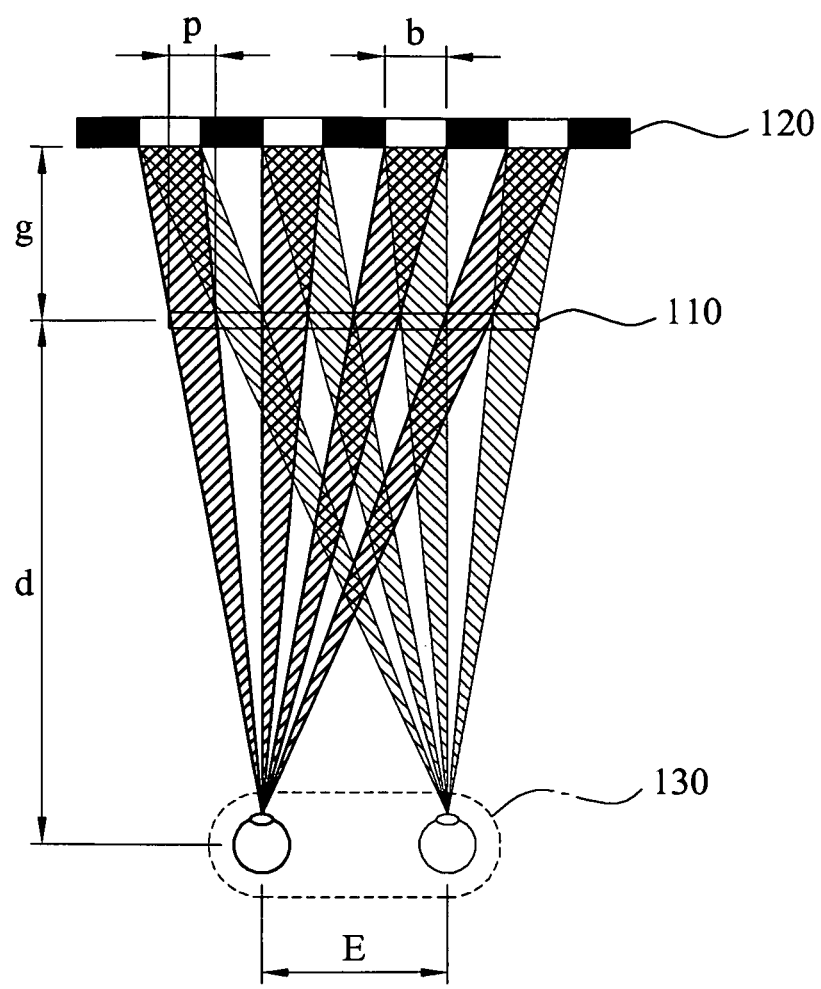
FIGS. 1 and 2 illustrate an operational principle of a two viewpoints 3-dimensional (3D) image display apparatus according to example embodiments.

Reference will now be made in detail to example embodiments, examples of which are illustrated in the accompanying drawings, wherein like reference numerals refer to the like elements throughout. Example embodiments are described below to explain the example embodiments by referring to the figures.

Figure 2:
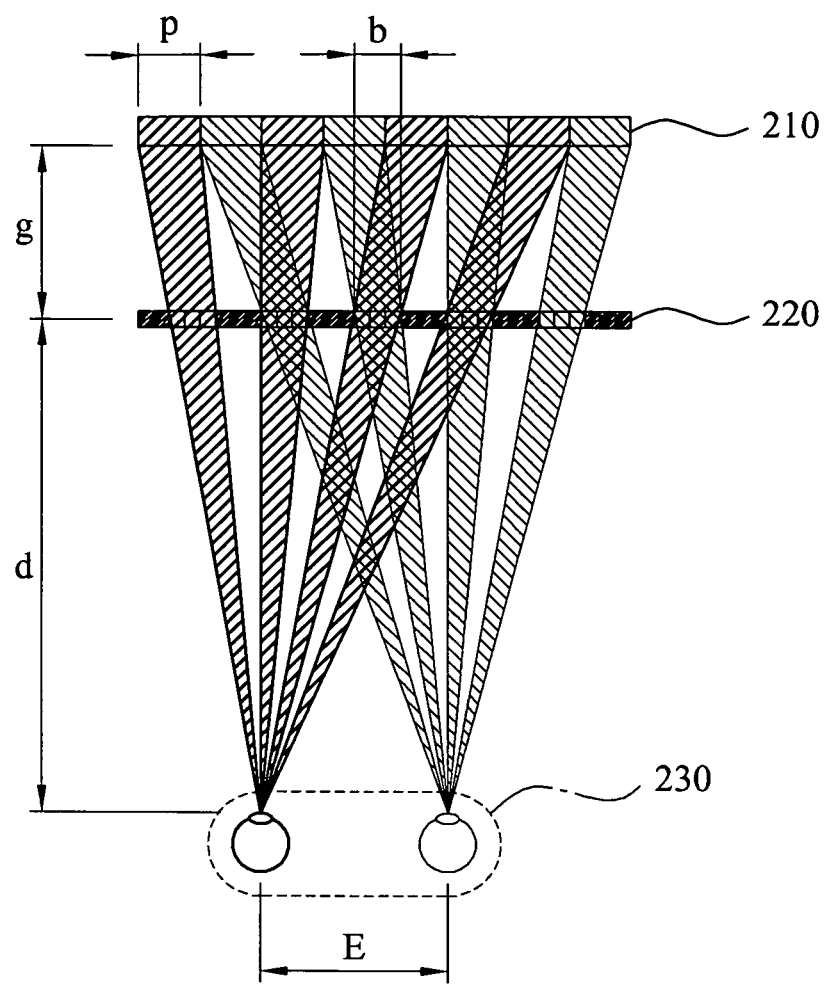

FIGS. 1 and 2 illustrate an operational principle of a two viewpoints 3-dimensional (3D) image display apparatus according to example embodiments.

First, referring to FIG. 1, the 3D image display apparatus may include an image display unit 110 and a backlight pattern display unit 120.

The image display unit 110 performs displaying of a multiview image.

The backlight pattern display unit 120 performs converting the multiview image displayed in the image display unit 110 into a 3D image.

The backlight pattern display unit 120 repeatedly displays a black and white pattern according to a specific pattern. In this instance, the white portion indicates a region where light is emitted and the black portion indicates a region where light is not emitted. As an example, the backlight pattern display unit 120 may include both a light emitting device and a non-light emitting device, and the light emitting device may be arranged in the white region.

The multiview image displayed in the image display unit 110 is displayed in the specific pattern by the backlight pattern display unit 120, and thus the image is recognized by a viewer 130 as a 3D image. That is, referring to FIG. 1, the viewer 130 recognizes an image of a pixel in an odd numbered position of the image display unit 110 is displayed to a left eye, and recognizes an image of a pixel in an even numbered position of the image display unit 110 is displayed to a right eye. The viewer 130 may recognize a 3D image by mentally compositing the images respectively recognized through the left eye and right eye.

In this instance, various parameters are required to be considered for effectively displaying the 3D image. As an example, FIG. 1 illustrates an operation of displaying the 3D image considering a length of a white portion b, a length p of a pixel included in the image display unit 110, a distance g between the image display unit 110 and backlight pattern display unit 120, a distance d from the viewer 130 to the 3D image display apparatus (specifically, to the image display unit 110 included in the 3D image display apparatus), and a distance between two eyes E of the viewer 130. In this instance, a relation of each parameter may be determined according to Equation 1 as below.

$$\frac{p}{g} = \frac{E}{g+d}, \frac{p}{d} = \frac{b}{g+d} \qquad \text{Equation 1}$$

That is, the 3D image display apparatus may adjust the above-mentioned five parameters according to Equation 1 and effectively display the 3D image. As an example, the 3D image display apparatus may display the 3D image through adjusting the length of the white portion b and the distance g between the image display unit 110 and the backlight pattern display unit 120 based on the preset length p of the pixel, an input distance E between two eyes, and the distance d from the viewer 130 to the 3D image display apparatus.

Subsequently, referring to FIG. 2, the 3D image display apparatus may include an image display unit 210 and barrier pattern display unit 220.

The image display unit 210 displays an input multiview image and the barrier pattern display unit 220 performs converting the multiview image displayed in the image display unit 210 into a 3D image.

Similar to the backlight pattern display unit 120 in FIG. 1, the barrier pattern unit 220 of FIG. 2 repeatedly displays a black and white pattern according to a specific pattern. In this instance, the black portion indicates a region where light is disconnected and the white portion indicates a region where light passes. In this case, a light source for emitting the light may be arranged in a back side of the image display unit 210 and the image display unit 210 may be composed of light emitting devices. As an example, the barrier pattern display unit 220 may include a transparent slit and an opaque slit, and the transparent slit may be arranged in the white region and the opaque slit may be arranged in the black region.

Accordingly, in the same manner as the 3D image display apparatus of FIG. 1, an audience 230 may recognize an image of a pixel in an odd numbered position of a image display unit 210 displays towards a left eye, and recognize an image of a pixel in an even numbered position of the image display unit 210 displays towards a right eye. The audience 230 may recognize a 3D image by mentally compositing the images recognized through the left eye and right eye. In this instance, parameters to effectively display the 3D image are the same as the parameters p, b, g, d, and E used for the 3D image display apparatus of FIG. 1.

Figure 3:
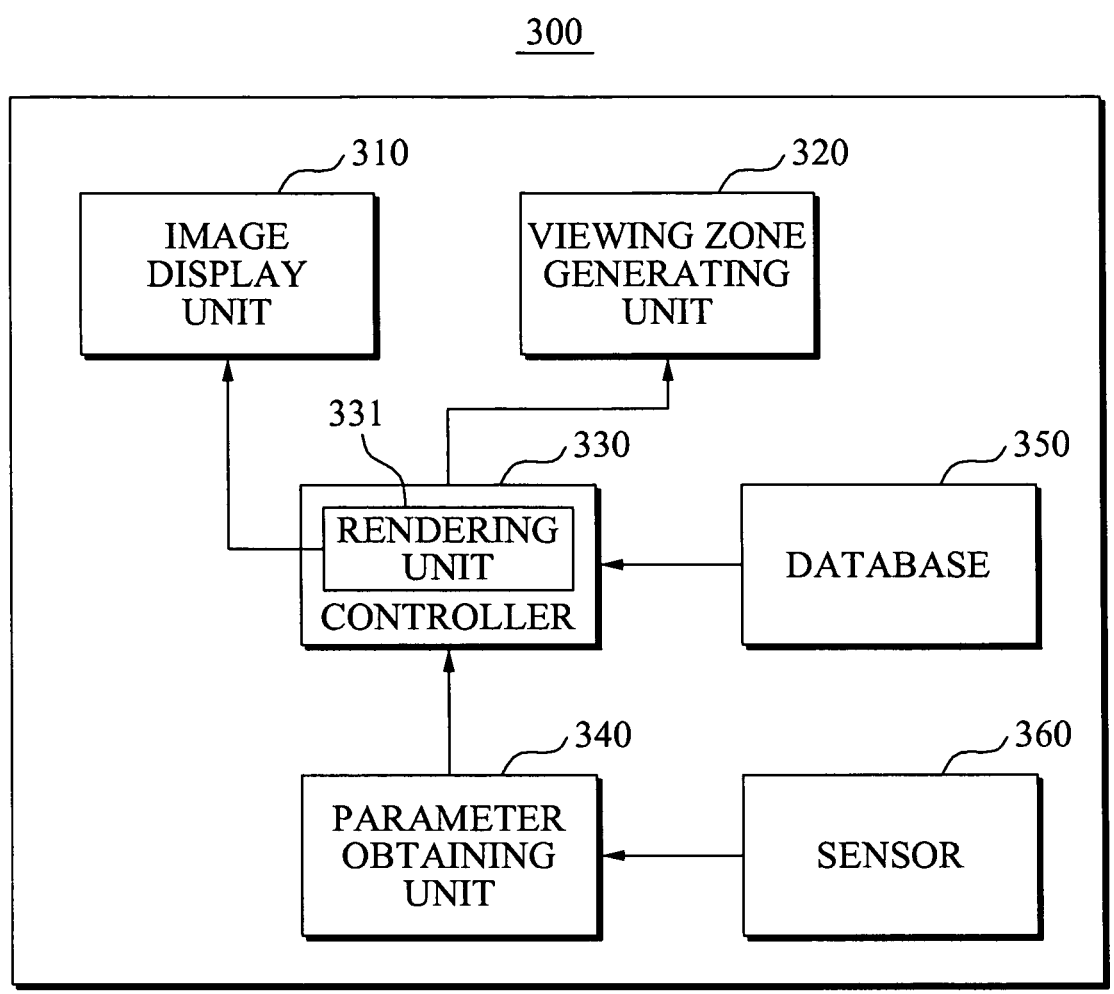
FIG. 3 illustrates a detailed configuration of a 3D image display apparatus according to example embodiments.

FIG. 3 illustrates a detailed configuration of a 3D image display apparatus according to example embodiments.

The 3D image display apparatus 300 according to example embodiments includes an image display unit 310, a viewing zone generating unit 320, and a controller 330. Also, according to example embodiments, the 3D image display apparatus 300 may further include a parameter obtaining unit 340 and a database 350. Hereinafter, function for each element will be described.

The image display unit 310 displays an input multiview image.

The multiview image is an image with respect to an object obtained from a variety of viewpoints to display the image in three dimensions.

According to example embodiments, the image display unit 310 may include any one of a Liquid Crystal Display (LCD), a Field Emission Display (FED), a Plasma Display Panel (PDP), and an Electroluminescent Display (ELD).

The LCD is an electric device that changes electric information generated from a variety of devices into visual information through varying a transmissivity of a liquid crystal according to an applied voltage. The FED is an electric device that emits electrons in the vacuum from a flat electron emitter, and then, makes the electrons collide with a fluorescent substance so as to emit light. The PDP is an electric device that emits Neon light via a provided gas, such as Ne+Ar, Ne+Xe, and the like, between glass plates hermetically sealed by a front glass plate, a rear glass plate and a partition there between, and then applying a voltage through a positive electrode and a negative electrode.

The viewing zone generating unit 320 has a display pattern and generates a plurality of viewing zones corresponding to the multiview image according to the display pattern.

That is, to display the multiview image in three dimensions, the viewing zone generating unit 320 performs generating a viewing zone with respect to each viewpoint image included in the multiview image according to a specific pattern.

According to example embodiments, the viewing zone generating unit 320 may include a parallax barrier arranged in a front side of the image display unit 310, and in this instance, the display pattern of the viewing zone generating unit 320 may include an array pattern of transparent slits and opaque slits composing the parallax barrier.

That is, the 3D image display apparatus 300 may display the 3D image according to the parallax barrier method and the viewing zone generating unit 320 including the parallax barrier may be arranged in the front side of the image display unit 310, namely between the image display unit 310 and an audience, and generate a plurality of viewing zones according to the display pattern of the parallax barrier, thereby enabling the audience to recognize the 3D image. In this instance, a light source for providing light to the image display unit 310 may be arranged in a back side of the image display unit 310, and the image display unit 310 may be constructed to include a light emitting device.

According to example embodiments, the viewing zone generating unit 320 may be arranged in the back side of the image display unit 310 and include a backlight for providing light to the image display unit 310. In this instance, the display pattern of the viewing zone generating unit 320 may include an array pattern of light emitting devices and non light emitting devices composing the backlight.

Also, when the viewing zone generating unit 320 is arranged in the back side of the image display unit 310 and provides the light to the image display unit 310, the viewing zone generating unit 320 may include any one of LCD, FED, PDP, and ELD.

That is, the 3D image display apparatus may display the 3D image according to a back light distribution method and the viewing zone generating unit 320 performing a role of the backlight may be arranged in the back side of the image display unit 310 and may generate a plurality of viewing zones according to a display pattern of the backlight, thereby enabling the audience to recognize the 3D image.

The controller 330 may vary a distance between the image display unit 310 and viewing zone generating unit 320, and a display pattern of the viewing zone generating unit 320.

When a distance between viewpoints is not sufficiently close, the audience who views the 3D image for a long time may experience visual fatigue. Therefore, to reduce the visual fatigue, the distance between the viewpoints is required to be close. However, when a plurality of audiences view the 3D image at the same time while the distance between the viewpoints is close, a resolution of a 2D image at a certain viewpoint becomes significantly low. Therefore, to prevent deterioration of the resolution of each viewpoint image, the distance between the viewpoints is required to be relatively longer to obtain a viewing angle at which the plurality of audiences may view the 3D image at the same time.

Accordingly, the controller 330 varies the distance between the image display unit 310 and viewing zone generating unit 320, and the display pattern of the viewing zone generating unit 320 in order to effectively display the 3D image through varying a number of viewpoints and the distance between the viewpoints according to a circumstance.

That is, when a single audience views the 3D image, the distance between the viewpoints is required to be closer, thereby enabling the audience to view a natural 3D image. Also, when a plurality of audiences view the 3D image, the distance between the viewpoints is required to be long enough to broaden the viewing angle, thereby enabling the plurality of audiences to view the 3D image at the same time. This may be embodied through varying the distance between the image display unit 310 and the viewing zone generating unit 320, and the display pattern of the viewing zone generating unit 320. In this case, the image display unit 310 may display a multiview image rendered based on the varied image display unit 310 and viewing zone generating unit 320.

According to example embodiments, the 3D image display apparatus 300 may further include the parameter obtaining unit 340.

The parameter obtaining unit 340 obtains an image display parameter including at least one piece of information from among: a number of viewpoints of the 3D image, the distance between the viewpoints, and distance from the 3D image display apparatus 300 to the viewpoint.

That is, the parameter obtaining unit 340 performs obtaining an image display parameter required for effectively expressing the 3D image according to a circumstance. The circumstance of viewing the 3D image may include the number of viewpoints of the 3D image, a distance between viewpoints, and a viewing distance.

When the parameter obtaining unit 340 obtains the image display parameter including at least one among the number of viewpoints of the 3D image, the distance between the viewpoints, and the distance from the 3D image display apparatus 300 to the viewpoint, namely the viewing distance, the controller 330 varies the distance between the image display unit 310 and viewing zone generating unit 320 and the display pattern of the viewing zone generating unit 320 based on the image display parameter. The image display parameter may be directly input by the audience.

According to example embodiments, the controller 330 may include a rendering unit (not illustrated) that renders an input multiview image based on the image display parameter. In this instance, the image display unit 310 displays the rendered multiview image and the 3D image display apparatus 300 expresses the 3D image based on the rendered multiview image.

According to example embodiments, the 3D image display apparatus 300 may further include a sensor (not illustrated) to obtain the image display parameter.

That is, the 3D image display apparatus 300 may obtain information with respect to the number of viewpoints, the distance between the viewpoints, and the viewing distance included in the image display parameter using the sensor (not illustrated). In this instance, the audience may view a natural 3D image without directly inputting the image display parameter.

According to example embodiments, the 3D image display apparatus 300 may further include the database 350.

The database 350 stores at least one display pattern type with respect to the display pattern of the viewing zone generating unit 320.

When the image display parameter is obtained, the controller 330 verifies whether a pattern display type corresponding to the obtained image display parameter is stored in the database 350. When the corresponding pattern display type exists, the controller 330 changes the display pattern of the viewing zone generating unit 320 into the verified pattern display type.

According to example embodiments, the 3D image display apparatus 300 may further include a liquid crystal unit (not illustrated).

The liquid crystal unit (not illustrated) may be arranged between the image display unit 310 and the viewing zone generating unit 320.

As described above, the 3D image display apparatus 300 varies the distance between the image display unit 310 and the viewing zone generating unit 320, thereby effectively expressing the 3D image. The same effect may be obtained through varying an optical distance as well as varying the above mentioned physical distance.

That is, the 3D image display apparatus 300 may further include the liquid crystal unit (not illustrated) between the image display unit 310 and viewing zone generating unit 320. In this instance, the controller 330 varies a distance that light travels, namely the optical distance, through adjusting a refractive index of the liquid crystal unit, thereby effectively expressing the 3D image.

According to example embodiments, the controller 330 adjusts the refractive index of the liquid crystal unit through varying an array direction of molecules composing the liquid crystal unit, thereby varying the distance (optical distance) between the image display unit 310 and viewing zone generating unit 320. In this instance, the controller 330 may vary the array direction of the molecules composing the liquid crystal unit through varying a level of a voltage applied to the liquid crystal unit.

Figure 4:
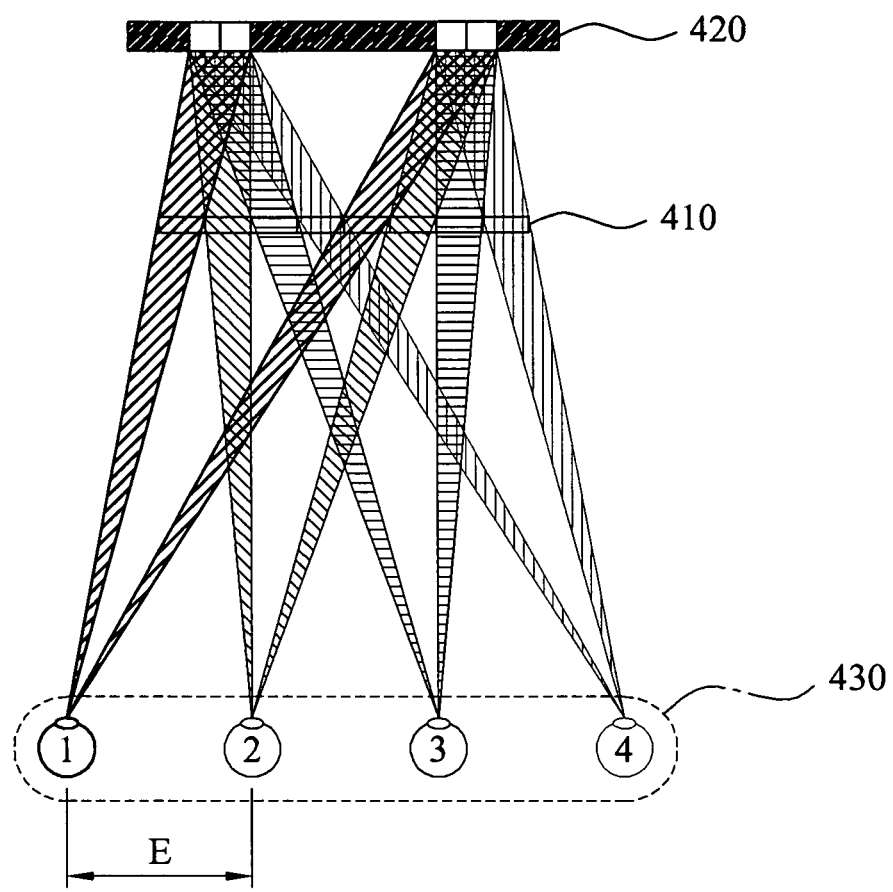
FIGS. 4 to 6 illustrate an operational principle of a 3D image display apparatus using a backlight distribution method according to example embodiments.
Figure 5:
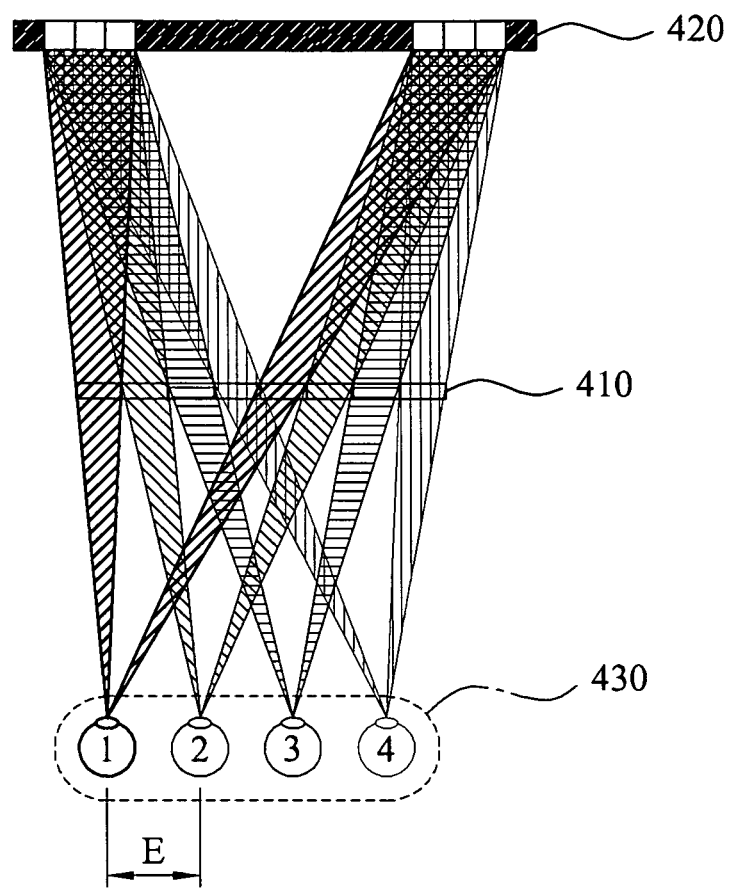
Figure 6:
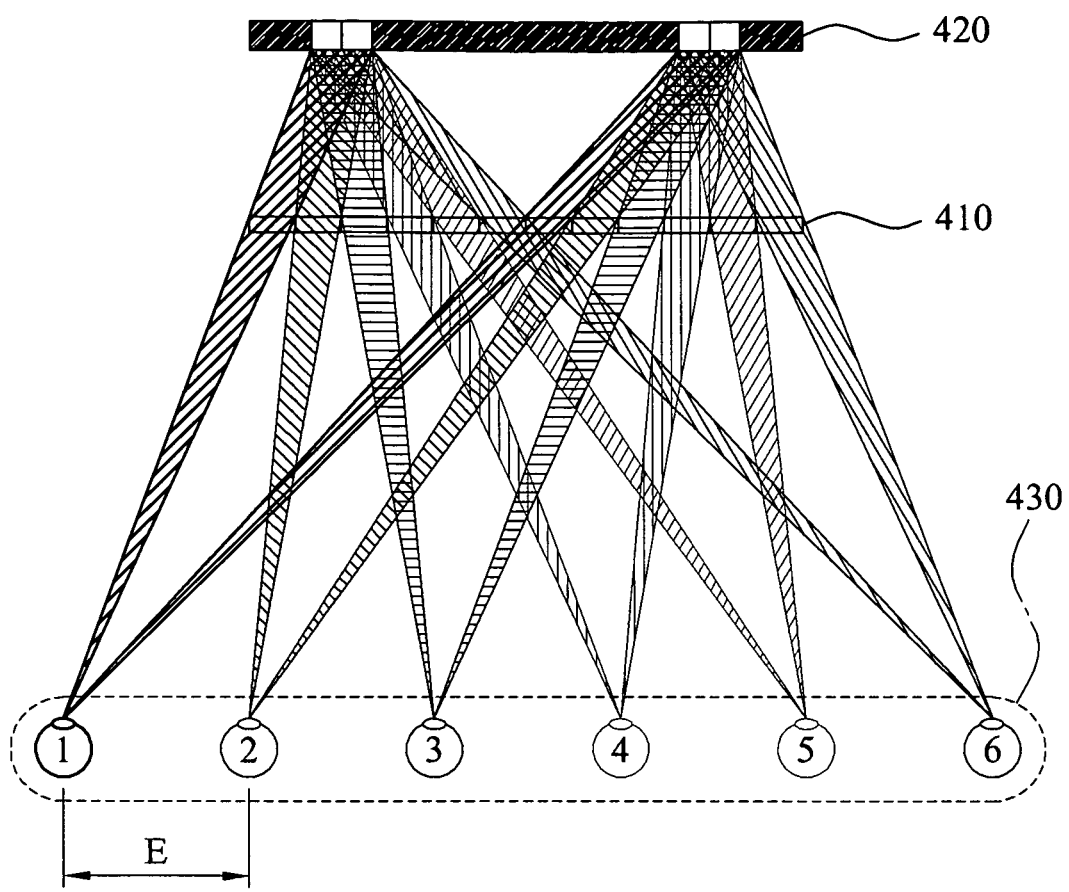

FIGS. 4 to 6 illustrate an operational principle of a 3D image display apparatus using a backlight distribution method according to example embodiments.

The 3D image display apparatus illustrated in FIGS. 4 to 6 corresponds to the 3D image display apparatus illustrated in FIG. 1.

First, compared with FIG. 1, FIG. 4 illustrates an operation of the 3D image display apparatus when a number of viewpoints 430 of a 3D image increases. That is, in FIG. 4, the number of viewpoints 430 of the 3D image increases from two viewpoints (as shown in FIG. 1, 130) to four viewpoints 430.

Referring to FIGS. 1 and 4, when the number of viewpoints increases (from FIG. 1, 130, to FIG. 4, 430), a black and white pattern of a backlight pattern display unit (FIG. 1, 120, and FIG. 4, 420) is varied to obtain a sufficient viewing angle. Also, as an example, a ratio of a length of the black and white of the backlight pattern display unit (FIG. 1, 120, and FIG. 4, 420) may be determined according to Equation 2 below.

$$\text{a length of a black portion:a length of a white portion}=1{:}n-1 \quad \text{Equation 2}$$

Here, n indicates a number of viewpoints of an input image.

Subsequently, compared with FIG. 4, FIG. 5 illustrates an operation of the 3D image display apparatus when the distance E between the viewpoints of the 3D image is closer.

Referring to FIGS. 4 and 5, when a distance between the viewpoints E becomes closer, a distance between an image display unit 410 and the backlight pattern display unit 420 increases and a pattern of the black and white of the backlight pattern display unit 420 is varied. In this instance, a ratio of the length of the black to the length of the white of the backlight pattern display unit 420 is also determined according to Equation 2.

Finally, compared with FIG. 4, FIG. 6 illustrates an operation of the 3D image display apparatus when the number of viewpoints 430 of the 3D image increases. That is, in FIG. 6, the number of viewpoints of the 3D image increases from four viewpoints, as shown in FIG. 4, 430, to six viewpoints, as shown in FIG. 6, 430.

Referring to FIGS. 4 and 6, the 3D image display apparatus varies the pattern of the black and white of the backlight pattern display unit 420 to obtain a sufficient viewing angle. A ratio of the length of the black to the length of the white of the backlight pattern display unit 420 may be determined according to Equation 2.

Figure 7:
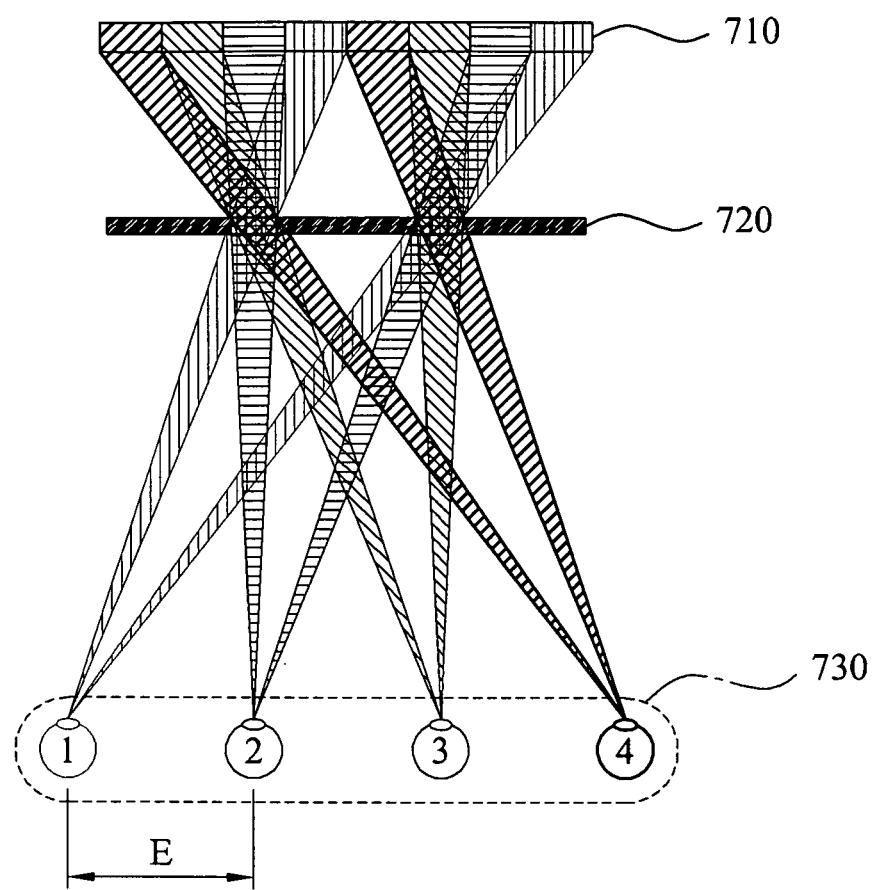
FIGS. 7 to 9 illustrate an operational principle of a 3D image display apparatus using a parallax barrier method according to example embodiments.
Figure 8:
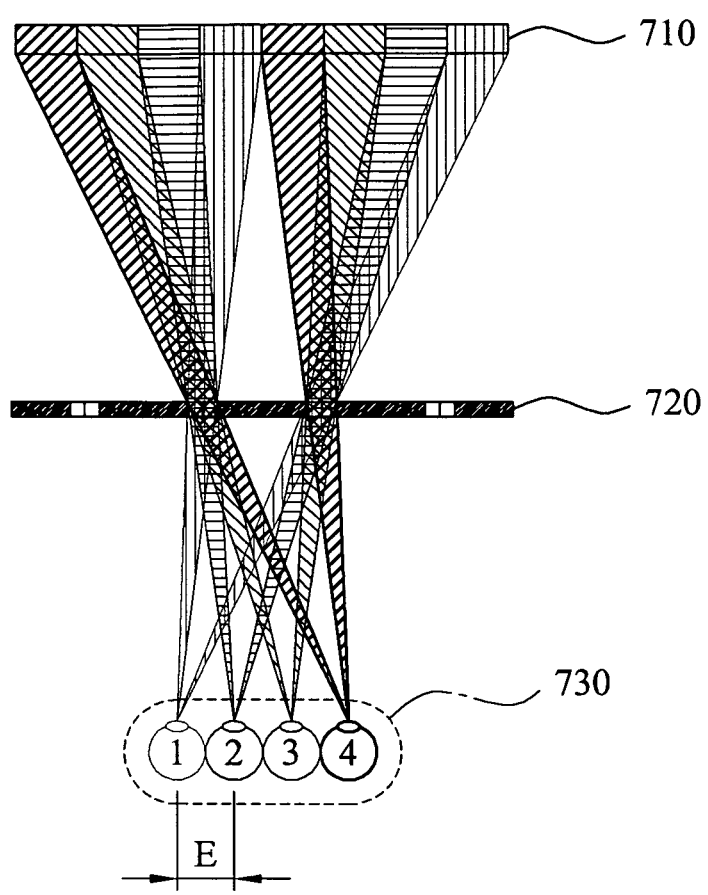
Figure 9:
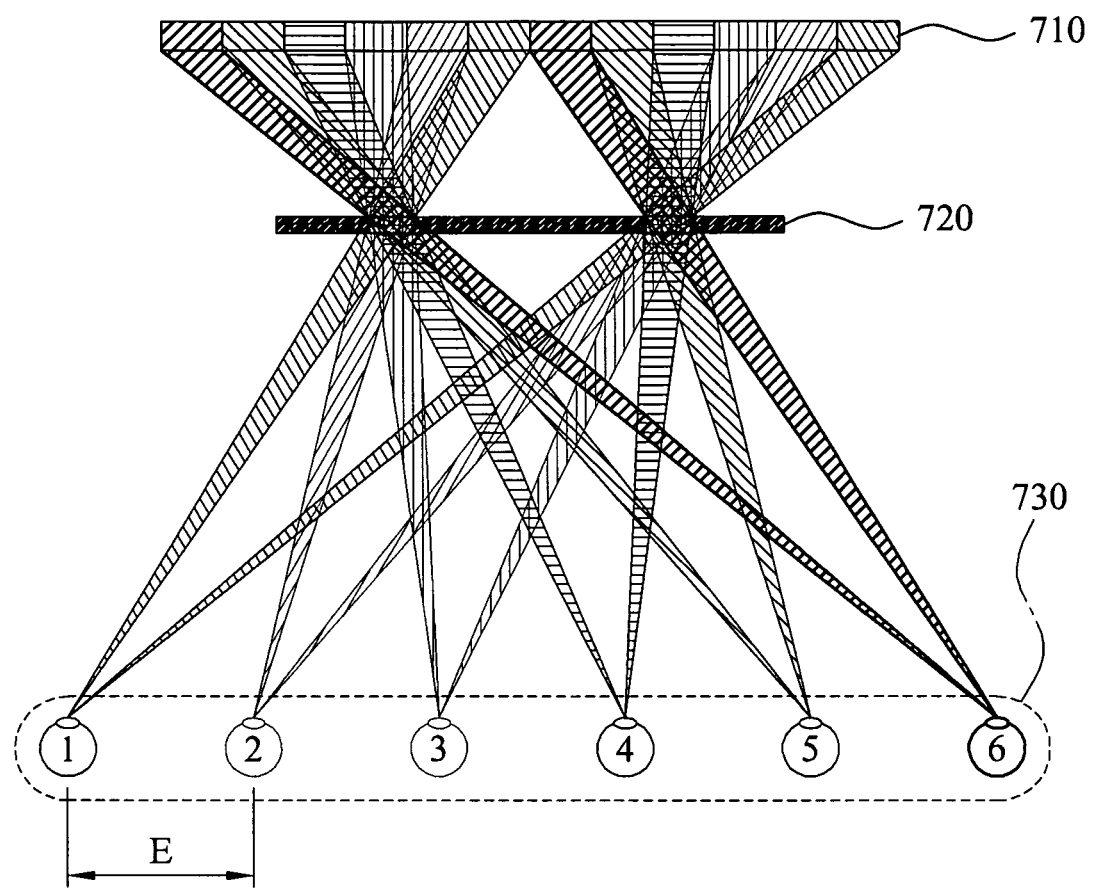

FIGS. 7 to 9 illustrate an operational principle of a 3D image display apparatus using a parallax barrier method according to example embodiments.

The 3D image display apparatus illustrated in FIGS. 7 to 9 corresponds to the 3D image display apparatus illustrated in FIG. 2.

First, compared with FIG. 2, FIG. 7 illustrates an operation of the 3D image display apparatus when a number of viewpoints of a 3D image increases (from FIG. 2, 230 to FIG. 7, 730). That is, in FIG. 7, the number of viewpoints of the 3D image increases from two viewpoints to four viewpoints.

Referring to FIGS. 2 and 7, when the number of viewpoints increases, a black and white pattern of a barrier pattern display unit 720 is varied to obtain a sufficient viewing angle. A ratio of a length of the black and white of the backlight pattern display unit 720 may also be determined according to Equation 2.

Subsequently, compared with FIG. 7, FIG. 8 illustrates an operation of the 3D image display apparatus when a distance between viewpoints E of a 3D image is closer.

Referring to FIGS. 7 and 8, when the distance between the viewpoints is closer, the distance between an image display unit 710 and the barrier pattern display unit 720 increases to reduce a viewing angle, and the pattern of the black and white of the barrier pattern display unit 720 is varied. A ratio of a length of the black and white of the backlight pattern display unit 720 may be determined according to Equation 2.

Finally, compared with FIG. 7, FIG. 9 illustrates an operation of the 3D image display apparatus when the number of viewpoints 730 of the 3D image increases. That is, in FIG. 9, the number of viewpoints 730 increases from four viewpoints (as shown in FIG. 7) to six viewpoints.

Referring to FIGS. 7 and 9, the 3D image display apparatus varies the pattern of the black and white of the barrier pattern display unit 720 to obtain a sufficient viewing angle. A ratio of a length of the black and white of the backlight pattern display unit 720 may be determined according to Equation 2.

Figure 10:
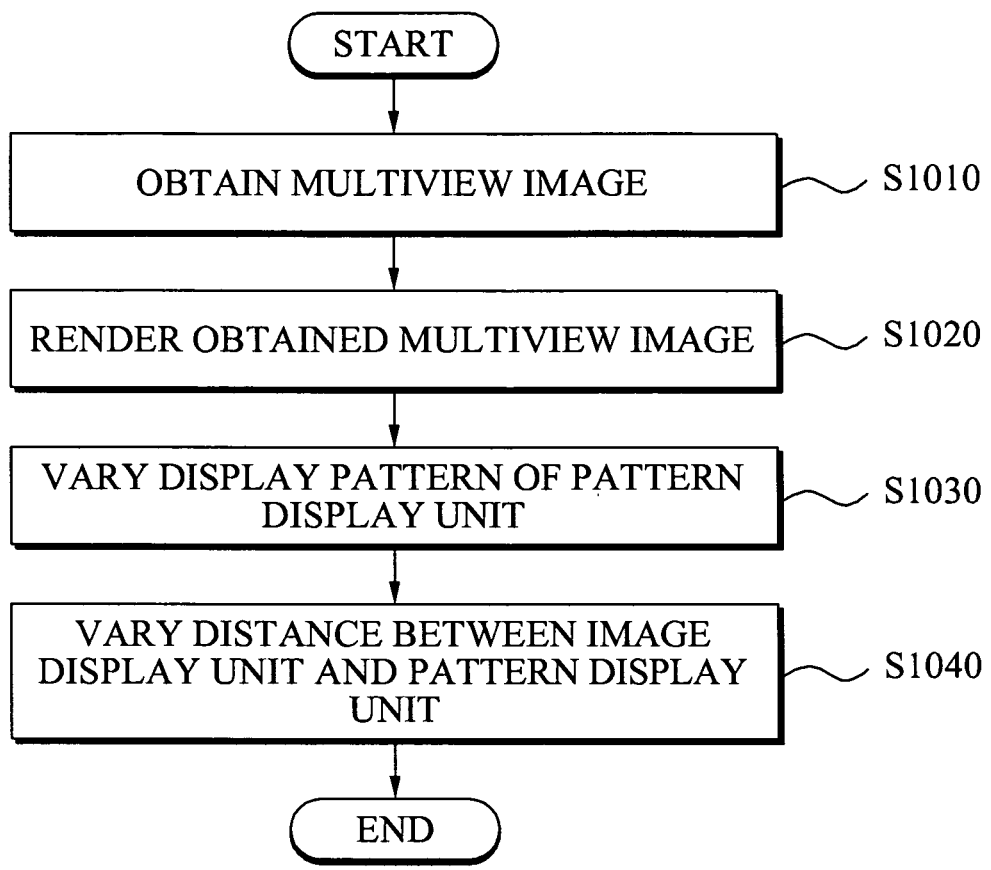
FIGS. 10 to 11 illustrate a 3D image display method according to example embodiments.
Figure 11:
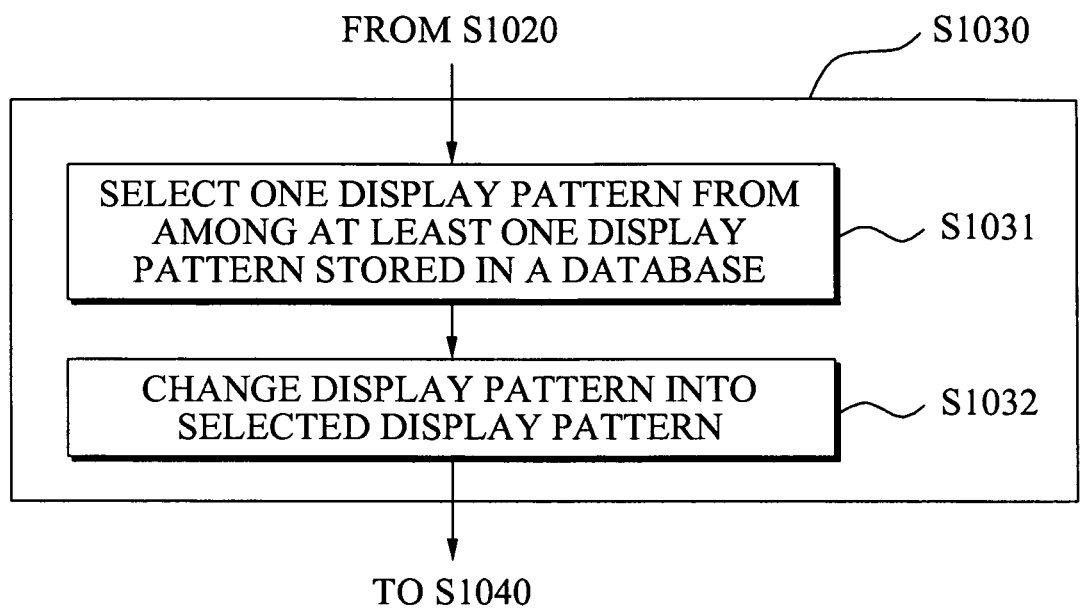

FIGS. 10 to 11 illustrate a 3D image display method according to example embodiments. Hereinafter, each operation will be described referring to FIGS. 10 and 11.

First, a multiview image is obtained in operation S1010. The multiview image is a plurality of 2D images to be expressed as a 3D image.

The obtained multiview image is rendered and displayed on an image display unit in operation S1020.

The rendering may be performed corresponding to subsequent operations S1030 and S1040, that is, the rendering may be performed to correspond to a varying of a display pattern of a pattern display unit in operation S1030 and a varying of a distance between the image display unit and pattern display unit in operation S1040.

The display pattern of the pattern display unit is varied to generate a plurality of viewing zones corresponding to the rendered multiview image in operation S1030.

The multiview image is displayed in a specific pattern by the pattern display unit. Also, an audience of a 3D image may recognize different images respectively through a left eye and a right eye and then recognize the images as the 3D image by mentally compositing the images.

According to example embodiments, the pattern display unit may include a parallax barrier arranged in a front side of the image display unit, and the display pattern of the pattern display unit may include an array pattern of transparent slits and opaque slits composing the parallax barrier. Also, according to example embodiments, the pattern display unit may include a backlight arranged in a back side of the image display unit and providing light to the image display unit, and the display pattern of the pattern display unit may include an array pattern of light emitting devices and non-light emitting devices composing the backlight. This is to express the 3D image via a parallax barrier method or backlight distribution method.

The distance between the image display unit and the pattern display unit is varied in operation S1040.

Operations S1030 and S1040 are to effectively express the 3D image depending on a circumstance of viewing various 3D images, wherein the circumstance may include a number of viewpoints of a 3D image, a distance between viewpoints, and the like.

According to example embodiments, the 3D image display method may further include obtaining an image display parameter including at least one piece of information from among: the number of viewpoints of the 3D image, the distance between viewpoints, and a distance from the 3D image display apparatus to a viewpoint.

That is, in an operation of obtaining of the image display parameter, an image display parameter including information required for effectively expressing the 3D image according to the circumstance is obtained. The information may include the number of viewpoints, the distance of viewpoints, and a viewing distance according to the circumstance.

When the image display parameter is obtained, operations S1020 to S1040 are performed based on the obtained image display parameter. That is, the multiview image is rendered and displayed on the image display unit based on the image display parameter in operation S1020, a pattern of the pattern display unit is varied based on the image display parameter in operation S1030, and the distance between the image display unit and the pattern display unit is varied based on the image display parameter in operation S1040.

As an example, the image display parameter may be directly input by the audience, and also may be obtained through a sensor attached to the 3D image display apparatus without being inputted by the audience.

According to example embodiments, in operation S1040, an optical distance between the image display unit and the pattern display unit may be varied through adjusting a refractive index of a liquid crystal unit arranged between the image display unit and the pattern display unit.

That is, an effect obtained by adjusting the optical distance between the image display unit and the pattern display unit may be the same as an effect obtained by adjusting a physical distance between the image display unit and the pattern display unit.

Also, according to example embodiment, in operation S1040, the refractive index of the liquid crystal unit may be adjusted through varying an array direction of molecules composing the liquid crystal unit, and thus the distance (optical distance) between the image display unit and the pattern display unit is varied. This is performed through a voltage level applied to the liquid crystal.

According to example embodiments, operation S1030 may include operation S1031 that selects one from among at least one display pattern type stored in a database and operation S1032 that changes a display pattern into the selected display pattern type. In this instance, the operations S1031 and S1032 may be performed based on the obtained image display parameter. That is, when the image display parameter is obtained, whether a pattern display type corresponding to the obtained image display parameter is stored in the database is verified in operation S1031. When the corresponding pattern display type exists, the display pattern of the pattern display unit is changed into the verified pattern display unit in operation S1032.

Example embodiments of a 3D image display method have been described, and structures with respect to a 3D image display apparatus described in FIG. 3 are applicable to the above example embodiments. Accordingly, detailed description will be omitted.

The 3D image display method according to the above-described example embodiments may be recorded in computer-readable media including program instructions to implement various operations embodied by a computer. The media may also include, alone or in combination with the program instructions, data files, data structures, etc. The media and program instructions may be those specially designed and constructed for the purposes of example embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, etc. The media may also be a transmission medium such as optical or metallic lines, wave guides, etc., transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for displaying a 3-dimensional (3D) image, the apparatus comprising:
    an image display unit to display a multiview image;
    a viewing zone generation unit having a display pattern to generate a plurality of viewing zones corresponding to the multiview image according to the display pattern;
    a controller to vary a physical distance between the image display unit and the viewing zone generation unit, and the display pattern; and
    a liquid crystal unit arranged between the image display unit and the viewing zone generation unit,
    wherein the controller adjusts a refractive index of the liquid crystal unit and varies an optical distance between the image display unit and the viewing zone generation unit,
    wherein the controller dynamically changes the display pattern and the physical and optical distances between the image display unit and the viewing zone generation unit, according to a change in number of viewpoints and a change in distance between viewpoints to obtain a desired viewing angle.

2. The apparatus of claim 1, wherein the viewing zone generation unit includes a parallax barrier arranged in a front side of the image display unit, and a display pattern of the viewing zone generation unit includes an array pattern of transparent slits and opaque slits composing the parallax barrier.

3. The apparatus of claim 1, wherein the viewing zone generation unit includes a backlight arranged in a back side of the image display unit and providing light to the image display unit, and a display pattern of the viewing zone generation unit includes an array pattern of light emitting devices and non-light emitting devices composing the backlight.

4. The apparatus of claim 1, further comprising:
    a parameter obtaining unit to obtain an image display parameter including at least one of a number of viewpoints of a 3D image, a distance between viewpoints, and a distance from the 3D image display apparatus to a viewpoint,
    wherein the controller operates based on the image display parameter.

5. The apparatus of claim 4, further comprising:
    a sensor to obtain the image display parameter.

6. The apparatus of claim 4, wherein the controller includes a rendering unit to render an input multiview image based on the image display parameter,
    wherein the image display unit displays the rendered multiview image.

7. The apparatus of claim 4, further comprising:
    a database to store at least one display pattern type with respect to the viewing zone generation unit,
    wherein the controller selects at least one of the display pattern types stored in the database based on the image display parameter, and changes the display pattern of the viewing zone generation unit into the selected display pattern type.

8. The apparatus of claim 1, wherein the controller adjusts the refractive index of the liquid crystal unit through varying an array direction of molecules composing the liquid crystal unit.

9. The apparatus of claim 1, wherein the image display unit includes any one of a Liquid Crystal Display (LCD), a Field Emission Display (FED), a Plasma Display Panel (PDP), and Electroluminescent Display (ELD).

10. A method of displaying a 3-dimensional (3D) image using a 3D image display apparatus including an image display unit and a pattern display unit, the method comprising:
  obtaining a multiview image;
  displaying the multiview image on the image display unit after rendering the multiview image;
  varying a display pattern of the pattern display unit to generate a plurality of viewing zones corresponding to the rendered multiview image; and
  varying a physical distance between the image display unit and the pattern display unit,
  wherein the varying of the distance comprises adjusting a refractive index of a liquid crystal unit arranged between the image display unit and the pattern display unit and varying an optical distance between the image display unit and the pattern display unit,
  dynamically controlling the display pattern and the physical and optical distances between the image display unit and the pattern display unit, according to a change in number of viewpoints and a change in distance between viewpoints, to obtain a desired viewing angle.

11. The method of claim 10, wherein the pattern display unit includes a parallax barrier arranged in a front side of the image display unit, and the display pattern of the pattern display unit includes an array pattern of transparent slits and opaque slits composing the parallax barrier.

12. The method of claim 10, wherein the pattern display unit includes a backlight arranged in a back side of the image display unit and providing light to the image display unit, and the display pattern of the pattern display unit includes an array pattern of light emitting devices and non-light emitting devices composing the backlight.

13. The method of claim 10, further comprising:
  obtaining an image display parameter including at least one of a number of viewpoints of a 3D image, a distance between viewpoints, and a distance from the 3D image display apparatus to a viewpoint,
  wherein the displaying of the multiview image renders the multiview image based on the image display parameter and display on the image display unit,
  the varying of the display pattern varies a pattern of the pattern display unit based on the image display parameter, and
  the varying of the distance adjusts the distance between the image display unit and the pattern display unit based on the image display parameter.

14. The method of claim 13, wherein the varying of the display pattern selects at least one of a plurality of display pattern types stored in a database based on the image display parameter, and changes the display pattern into the selected display pattern type.

15. The method of claim 10, wherein the varying of the distance adjusts the refractive index of the liquid crystal unit through varying an array direction of molecules composing the liquid crystal unit.

16. A non-transitory computer readable recording device storing a program for causing a processor to implement a method of claim 10.

17. The apparatus of claim 8, wherein when the controller varies the array direction of the molecules through varying a level of voltage applied to the liquid crystal unit.

18. The apparatus of claim 4, wherein when there are a plurality of viewpoints greater than two, the controller varies a display pattern of a backlight pattern display unit.

19. The apparatus of claim 18, wherein the controller varies a black and white pattern of the backlight pattern display unit to obtain a sufficient viewing angle, according to the ratio of:

$$\frac{a \text{ length of a black portion}}{a \text{ length of a white portion}} = \frac{1}{n-1}$$

where n is a number of viewpoints.

20. The apparatus of claim 1, further comprising a parameter obtaining unit to obtain an image display parameter including a number of viewpoints of a 3D image and a distance between viewpoints, wherein as the distance between viewpoints decreases, the controller increases a physical distance between the image display unit and the viewing zone generation unit, and as the number of viewpoints increases the controller varies the display pattern by increasing a length of a white portion of the display pattern relative to a length of a black portion of the display pattern.

* * * * *

UNITED STATES PATENT AND TRADEMARK OFFICE
CERTIFICATE OF CORRECTION

PATENT NO. : 8,451,324 B2
APPLICATION NO. : 12/382123
DATED : May 28, 2013
INVENTOR(S) : Ju Yong Park et al.

It is certified that error appears in the above-identified patent and that said Letters Patent is hereby corrected as shown below:

In the Claims:

Column 10, Line 22, In Claim 1, delete "viewpoints" and insert -- viewpoints, --, therefor.

Signed and Sealed this
Eighth Day of October, 2013

Teresa Stanek Rea
*Deputy Director of the United States Patent and Trademark Office*